April 17, 1962   I. A. FARNWORTH   3,029,907
AUTOMATIC TRAVEL ADJUSTER FOR AIR BRAKE PISTONS
Filed Nov. 18, 1958   4 Sheets-Sheet 1
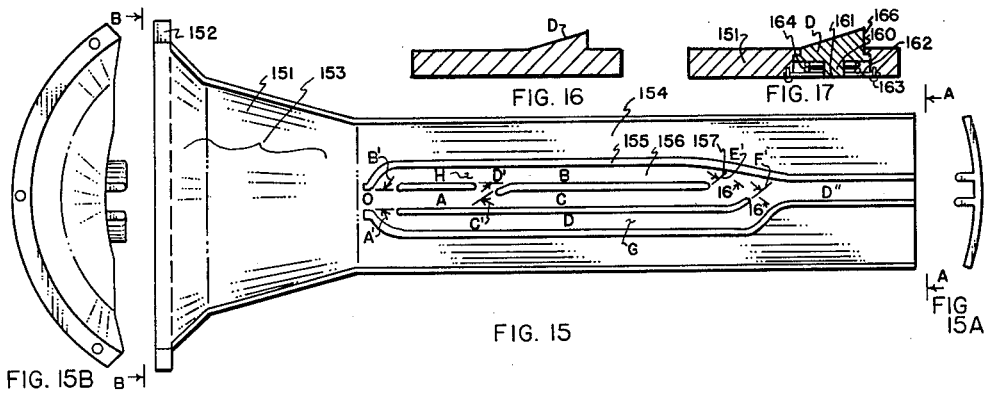
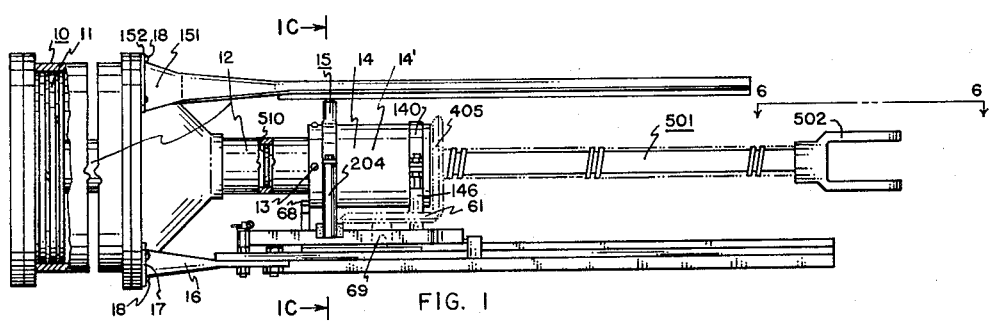
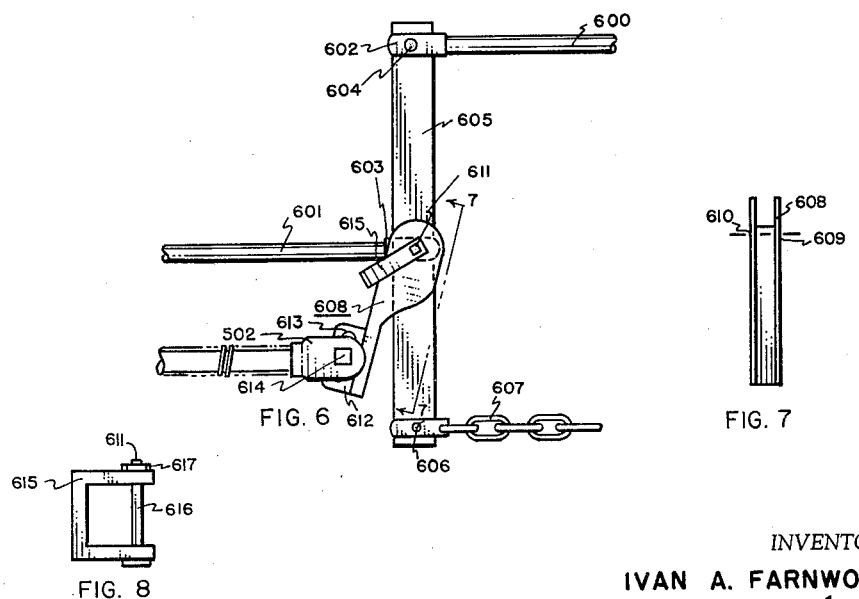
INVENTOR.
IVAN A. FARNWORTH
BY M. Ralph Shaffer
HIS ATTORNEY

*INVENTOR.*
IVAN A. FARNWORTH
BY M. Ralph Shaffer
HIS ATTORNEY

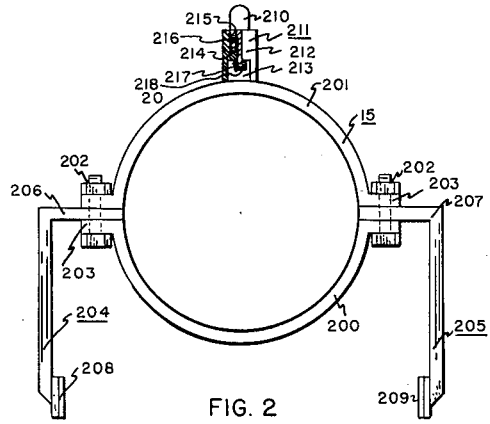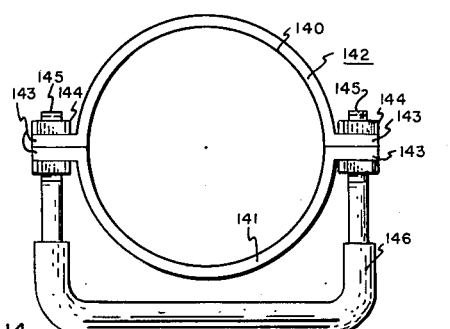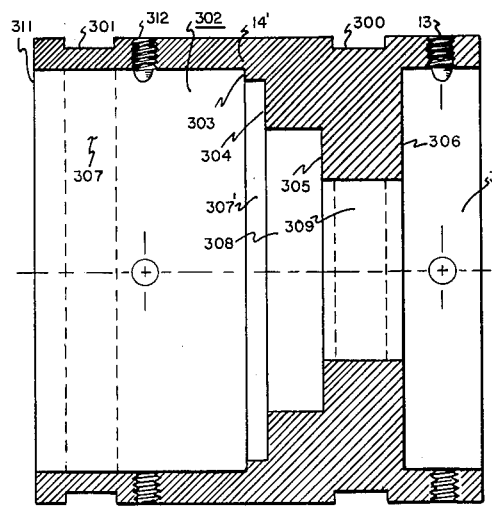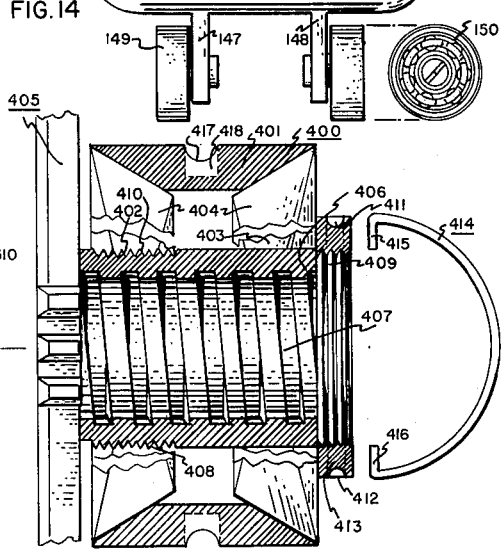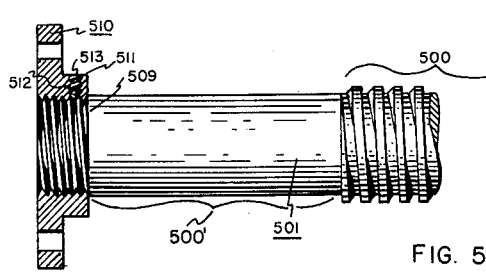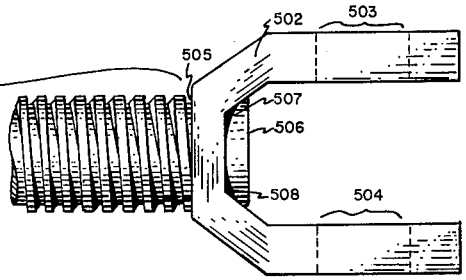
FIG. 2   FIG. 14   FIG. 3   FIG. 4   FIG. 5
INVENTOR.
IVAN A. FARNWORTH
BY  *M. Ralph Shaffer*
HIS ATTORNEY

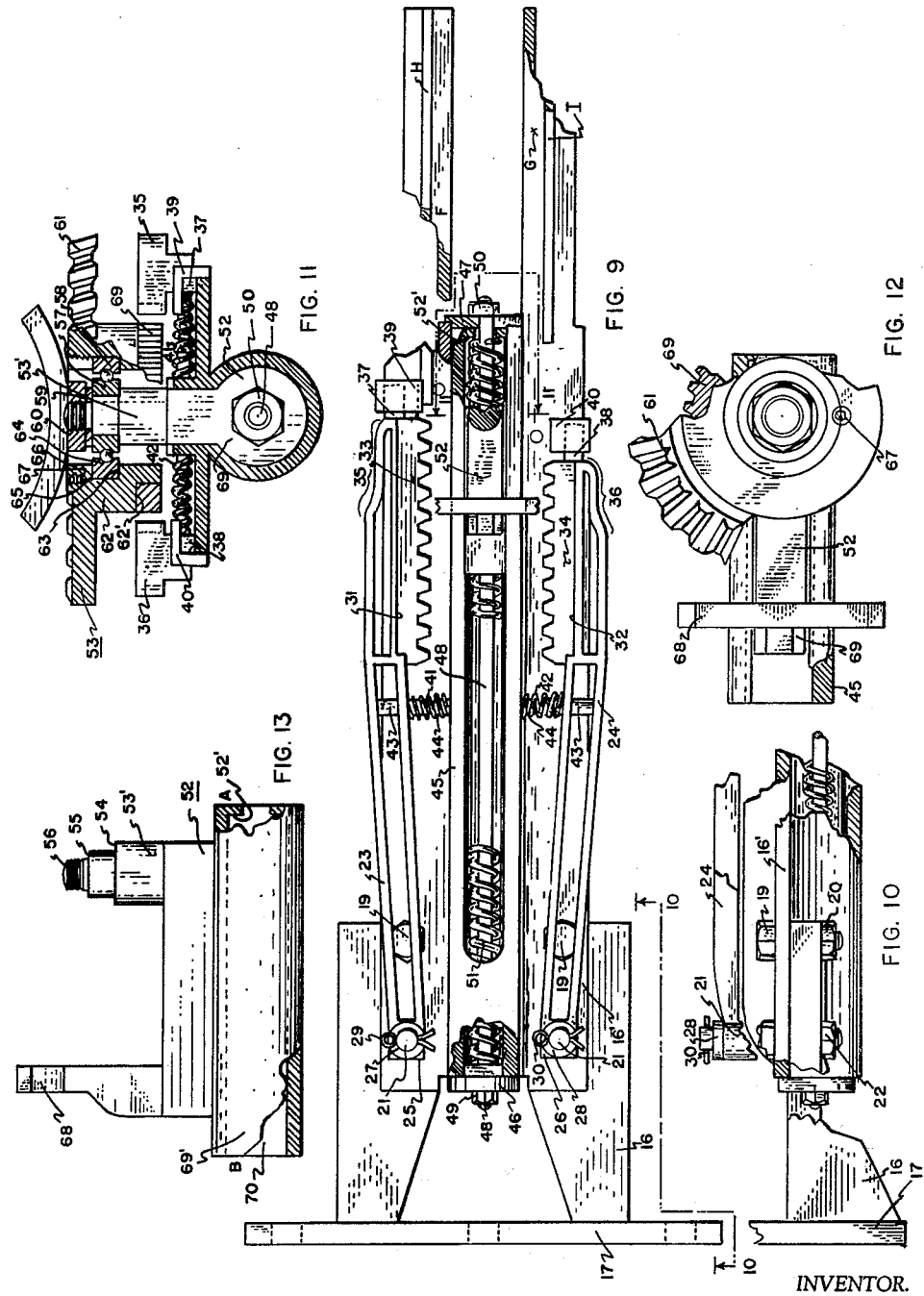

UNITED STATES PATENT OFFICE

3,029,907
Patented Apr. 17, 1962

3,029,907
AUTOMATIC TRAVEL ADJUSTER FOR AIR
BRAKE PISTONS
Ivan A. Farnworth, 441 S. State St., Orem, Utah
Filed Nov. 18, 1958, Ser. No. 774,717
11 Claims. (Cl. 188—202)

The invention relates to braking systems for railroad rolling stock, for example, and more particularly to compensating mechanisms therefor for automatically maintaining an adjustment of the linkage connecting an air brake piston with its associated brake mechanism so as produce actuation of the brakes at a predetermined length of piston travel.

A principal object of this invention therefore is to adjust automatically the length of the connecting linkage between the air-operated, brake-actuated piston and the brake rigging, in accordance with wear in the brake rigging or brake shoes or increased thickness of new brake shoes when installed, so that the brake applying stroke of the said actuating piston will be maintained substantially continuously at a constant given length. In the case of the present invention this principal object is accomplished in a manner and by a means which exhibit less complexity and necessitate less manufacturing cost than devices of the type described which have been used heretofore.

Another object of the present invention is to adjust automatically the air brake piston travel, which has been above described, by and during the brake applying movement of the brake system; this is to say, linkage adjustment is caused to transpire during the return strokes of one or a plurality of brake sets themselves.

A still further object is to adjust individually and independently the brakes of each associated railway car, for example, or other vehicle unit and thus maintain the same effective brake pressure and action on each of them.

A still further object is to provide a novel selector plate which may be employed to accomplish the above-mentioned objects.

In accordance with a preferred embodiment of the present invention, a threaded push rod is threaded through a rotatable adjustment gear, the latter maintaining a fixed-distance relation with respect to the associated air brake piston (i.e., translational movement of the piston along the axis thereof will be accompanied by a corresponding and equivalent translation of the adjustment gear). Nonetheless, in being threaded through the aforementioned adjustment gear, the effective length of the push rod, i.e. that regulated portion of the push rod extending forwardly from the adjustment gear, will be determined in accordance with the rotational displacement of the adjustment gear.

A drive means is cooperable with, so as to actuate, the said adjustment gear and is designed to be responsive to conditions of other-than-normal, air brake piston travel made necessary to accomplish brake "set." As shall be explained hereinafter, these conditions are translated by the drive means into the appropriate rotation of the adjustment gear so as to shorten or lengthen, as the case may be, the foreward length of the push rod with respect to the piston rod. Accordingly, actual piston travel will be constant despite brake and linkage wear after an adjustment period lasting one or more brake sets, depending upon wear.

In a preferred embodiment of the invention the drive means include a transmission gear cooperable with the aforementioned adjustment gear and "sensing" apparatus responsive to particular piston travel. The sensing apparatus will be shown to include a guide plate having a series of ridges, valleys and dogs, together with a co-operating finger mechanism which travels in between the ridges, through the valleys and over the dogs in particular patterns, the pattern taken at any one particular time depending upon the nature of piston travel, i.e. whether the travel is long, normal, or short. The ridges and valleys are arranged in such a way that for abnormal piston travel the finger will be displaced in either one direction or another for discrete intervals of time, the direction of displacement being dependent upon whether the piston travel is short or long. Such displacement in the representative embodiment of the invention produces engagement of an associated rack gear with a pinion, the latter cooperating to rotate the transmission and adjustment gears discrete amounts so as to accomplish lengthening or shortening of the effective length of the push rod. The complete apparatus of the invention and a complete description of the operation thereof is reserved for the discussion of the various drawings.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIGURE 1 is a left side elevation of the automatic travel adjuster mechanism, as contemplated by the present invention, when used with and attached to a conventional air brake cylinder.

FIGURE 2 is a front elevation of the selector finger and engagement fingers assembly shown in FIGURE 1.

FIGURE 3 is a vertical section of the cylindrical housing, the same being shown as attached to the air brake piston rod in FIGURE 1.

FIGURE 4 is a fragmentary view, principally in vertical cross section, of the bearing and adjustment gear apparatus which is mounted within the cylindrical housing of FIGURE 3.

FIGURE 5 is a side elevation, partly broken away for purposes of conservation drawing space, of the threaded push rod of FIGURE 1.

FIGURE 6 is a top view taken along the line 6—6 in FIGURE 1, indicating the manner of the attachment of the push rod clevis connection with the brake rigging.

FIGURE 7 is an elevation taken along the line 7—7 in FIGURE 6 and illustrating the side configuration of the jack knife thrust member employed to actuate the brake lever of FIGURE 6.

FIGURE 8 is a side elevation of the clevis and pin connection which ties the jack knife thrust member to the rest of the brake rigging including the brake lever shown in FIGURE 6.

FIGURE 9 is a plan view, partially broken away for purposes of clarity, illustrating particularly the lower support structure and actuating mechanism of the apparatus.

FIGURE 10 is a fragmentary side elevation taken along the line 10—10 in FIGURE 9.

FIGURE 11 is a view illustrating in cross section the various component parts of the drive pinion and transmission gear of FIGURE 9.

FIGURE 12 is a fragmentary plan view of the drive pinion and transmission gear assembly of FIGURE 9, illustrating its longitudinal movement within the bore of the support structure of FIGURE 9.

FIGURE 13 is a side elevation of the carrier member employed as a basic component part of the drive pinion and transmission gear assembly of FIGURES 9, 11 and 12.

FIGURE 14 is a front elevation of the carriage of FIG-

3

URE 1 which rolls along the support structure of FIGURE 9 in forward and rearward, longitudinal directions.

Figure 1B:
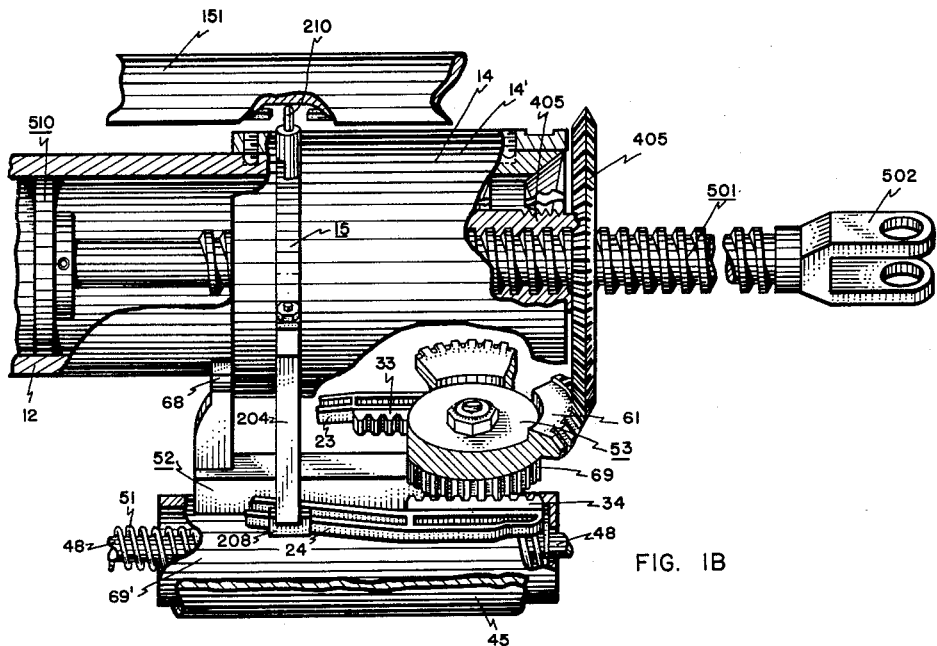
FIGURE 1B is an enlarged, fragmentary, perspective view of the principal, operating structure of FIGURE 1.
Figure 1C:
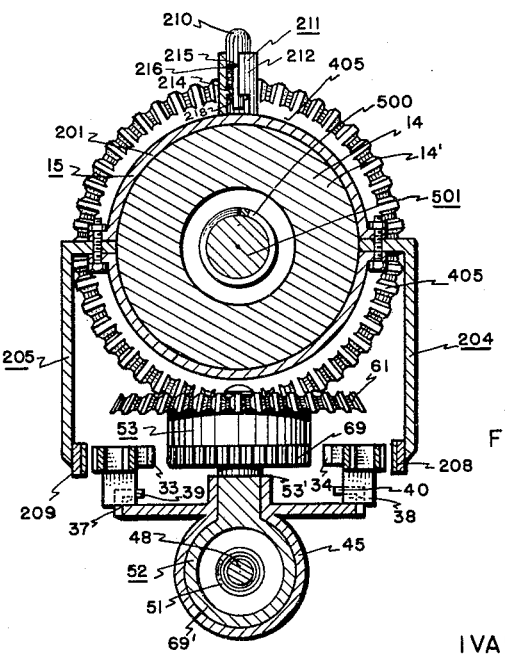
FIGURE 1C is an enlarged section taken along the line 1C—1C in FIGURE 1.

FIGURE 15 is a plan view, looking up, of the selector plate shown in FIGURE 1.

FIGURES 15A and 15B are left end and right end views, respectively, of the selector plate of FIGURE 15.

FIGURE 16 is a view taken along the line 16—16 in FIGURE 15, illustrating the surface configuration of each, direction-determining dog employed in the selector plate.

FIGURE 17 is a view of modification of the direction-determining dog, illustrating that each dog may be spring loaded so as to enable the use of a selector finger which is not spring loaded.

In FIGURE 1 the numeral 10 designates a conventional type air brake cylinder operating an air brake system such as is employed for railway cars, it being understood that the principles of the invention are equally applicable to any fluid pressure operated brake system. Slidably received in this cylinder 10 is an air pressure operated piston 11 for operating the air brakes. The piston 11 is supplied the conventional piston rod 12, the piston rod being of hollow or tubular construction. To the end of the piston rod is secured, as by means of set screws 13, a carrier assembly 14 the construction of which is to be hereinafter explained. The carrier assembly 14 includes a selector finger and engagement finger assembly 15 which, as will be shown, is slidably mounted within a recessed seat associated with the cylindrical housing 14' of carrier assembly 14 so as to be able to be turned or rotated within its seat about the outer periphery of carrier assembly 14.

The selector finger and engagement finger assembly is shown in particularity in front elevation view in FIGURE 2. The assembly is shown to consist of a lower semi-circular band 200 and an upper semi-circular band 201 which are joined together by conventional attachments 202, the latter cooperating by aligned apertures (not shown) with respect to outwardly extending mounting ears 203 thereof. The short travel rack engagement finger 204 and long travel rack engagement finger 205 have their respective upper portions 206 and 207, respectively, disposed inwardly so as to be adapted for securement in between associated mounting ears 203 by the attachments 202. Each of the fingers is provided with a lower, rack engaging portion 208 and 209, respectively. The operation of these rack engaging portions shall be described hereinafter. It suffices to say now that when the assembly in FIGURE 2 is rotated in a clockwise direction the rack engaging portion 209 will be directed inwardly so as to come in contact with its associated rack. Conversely, when the assembly of FIGURE 2 is rotated in a counter-clockwise direction, then the rack engaging portion 208 of finger 204 is caused to advance toward its respective rack. Such rotational movement as has been briefly described in connection with rack engaging portions 208 and 209 is produced by the coaction of finger 210 with the ridge and valley pattern of an associated selector plate, hereinafter to be described. Where the direction determining dogs on this selector plate are spring loaded, then finger 210 need only be rigidly affixed to or be a rigid part of the upper semi-circular band 201. When, however, the construction of the selector plate is rigid (including dogs thereof), then the finger 210 of finger assembly 211 is spring loaded within the assembly. Thus, casing 212 of finger assembly 211 is rigidly affixed to the upper semi-circular band 201 but is provided with an open area 213 at the base of the casing. The interior of the casing 212 is provided with a lower, inwardly directed shoulder 214, whereas the finger 210 is provided with an upper inner shoulder 215. These two shoulder areas 214 and 215 cooperate with the ends of compression spring 216, and the finger 210 is provided with a base aperture 217 accommodating the positioning therewithin of a retainer cotter pin 218.

4

Accordingly, when finger 210 advances over the direction constraining dogs, the finger is depressed against the action of compression spring 216; the finger 210 itself, however, is retained within its associated casing 212 by the coaction of cotter pin 218 against the casing edge associated with open region 213.

The cylindrical housing 14' is best illustrated in the vertical section thereof in FIGURE 3. Annular recess area 300 is provided to accommodate the slideable disposition therein of selector finger and engagement fingers assembly 15. An additional exterior recessed area 301 is supplied the cylindrical housing 14' for the carrier assembly, hereinafter to be described. The cylindrical housing 14' has a hollow interior area 302 provided with a series of shoulders 303, 304 and 305. By virtue of said shoulders, and rear shoulder 306, a plurality of intercommunicating cylindrical areas 307, 307', 308, 309 and 310 are supplied. The set screws 13 in FIGURE 1, one of which is shown in FIGURE 3, serve to mount cylindrical housing 14' to the end of hollow piston rod 12 in FIGURE 1. The end of piston rod 12 in FIGURE 1 abuts securely against shoulder 306 in FIGURE 3. The apparatus shown in FIGURE 4, except the gear therein shown in fragmentary view, is mounted within the open areas 306, 307 and 308 in FIGURE 3.

This apparatus in FIGURE 4 primarily includes a large multirace bearing 400 having outer race 401, inner races 402 and 403 and a pair of conically tapered bearing sets 404. The bearing is of conventional manufacture and the inner race 402 thereof is internally threaded. The adjustment gear 405, hereinafter to be described in detail, includes a mounting shank 406 which is provided with an internal, continuously threaded bore 407 and externally threaded areas 408 and 409. Inner bearing race 402 is threaded at 410 in an area which cooperates with threaded area 408 of shank 406. Thus, the threaded push rod (hereinafter to be described) when threaded through bore 407 of shank 406 may be held stationary so far as rotation is concerned, but, when gear 405 is actuated, will be threaded inwardly or outwardly within shank 406, thereby exhibit translational displacement with respect to the shank, the rotating gear and piston rod 12. A nut 411, conceivably of circular configuration as shown, completes the mounting of the bearing assembly 400 upon the shank 406 in being threaded upon threaded area 409 of the shank. The nut is supplied with an annular groove, or semi-annular groove 412 and includes appropriate radial apertures 413 so that the circularly curved lockwire 414, having ends 415 and 416, may be inserted within annular recess 411 such that inwardly directed ends 415 and 416 are directed within apertures 413 so as to come into contact with the threads of threaded area 409 of the gear shank 406. As is obvious, this lockwire 414 prevents nut 411 from backing off; thus, complete securement of bearing 400 upon gear shank 406 is achieved.

Accordingly, and considering FIGURES 3 and 4 together, it will be seen that since outer bearing race 401 includes an annular recess 417 and is provided with a plurality of radial bores 418, that the apparatus in FIGURE 4 may be mounted within the open areas 307, 307' and 308 of cylindrical housing 14'. In this mounting, adjustment gear 405 will be closely spaced with respect to end 311 of housing 14' but without touching the same. The entire bearing assembly will be disposed within areas 307 and 307', and with plurality of set screws 312 cooperating with the bores 418 of the outer race 401. Accordingly, the outer race 401 of bearing 400 is held against self-rotation by virtue of positioning of set screws 312 in FIGURE 3 in the bores 418 in FIGURE 4. Cylindrical area 308 in FIGURE 3 accommodates the positioning therewithin of the threaded end of the gear shank in cooperation with nut 411 and associated lockwire 414.

In FIGURE 5 is illustrated the threaded push rod 501 employed by the invention. The major portion 500 of push rod 501 is provided with a series of threads adapted to cooperate with the internally threaded region of gear shank 406 in FIGURE 4. Disposed upon and welded to the forward end of the push rod 501 is a clevis connector 502, the same having aligned apertures 503 and 504 in the clevis ears and an intermediate admittance aperture 505 through which the end 506 of the push rod 501 passes. The push rod end 506 may be welded to the clevis connector as at 507 and 508. The other end of the push rod, i.e. 509, is threaded for the reception of guide collar 510, this latter having a shank 511 which is provided with a radial bore 512 admitting set screw 513 to come in contact with the threaded end 509. This guide collar 510 serves in fact as a spacer guide, cooperating as it does with the interior bore of piston rod 12 in FIGURE 1. Thus, the collar 510 serves to insure that the threaded push rod 501, at points within the piston, is in fact always coaxial with the piston rod. Portion 500′, between threaded portion 509 and major portion 500, is unthreaded or smooth. This region 500′ exhibits a safety feature of the invention, insuring that damage due to the contact of the collar with the internally threaded gear 405 will not occur even though, should malfunction occur, push rod lengthening becomes grossly excessive. Of course, in order to do this, the region 500′ will have to be of a size exceeding the shank length of gear 405, or at least the threaded area of the bore thereof.

With the above brief description of the push rod of FIGURE 5 it will be seen with reference to FIGURE 1 that so long as the clevis connection 502 in FIGURE 1 is maintained at the disposition therein shown, then, upon the rotation of adjustment gear 405 in FIGURE 1 the push rod 501, in cooperation with its threads and the associated threads of the gear shank 406 in FIGURE 3, will be translated either to the right of the viewer and away from the piston rod or to the left of the viewer and into the piston rod, thereby lengthening or shortening, as the case may be, that portion of the push rod which protrudes from the adjustment gear 405. Thus, carrier assembly 14 journalling adjustment gear 405 may be thought of as "push rod reference means" or reference structure for the adjustment movements of push rod 501.

The inter-action of the push rod 501, and in particular of its clevis connector 502 with the brake rigging proper is best illustrated in FIGURE 6 wherein is shown a pair of brake rods 600 and 601 having respective clevis end connectors 602 and 603 (the former being pinned at 604) and the joining thereof by brake lever 605. The remaining end of the brake lever 605 is supplied a clevis connector 606 to which the conventional hand wheel brake chain or cable 607 may attach. Jack knife thrust member 608, which may be considered as hollow in having a U-shaped, cross-sectional configuration as illustrated in FIGURE 7, is supplied a pair of aligned apertures 609 and 610 for linkage pin 611 and exhibits the connecting portion 612 provided with slot 613. As is seen in FIGURE 6, slot 613 is laterally elongated so as to take into account the arcuate travel of member 608 in response to forward or reverse actuation of the push rod. The pin 614 in FIGURE 6 intercouples the clevis connector 502 to the portion 612 of the jack knife thrust member 608. If used, a C-configured retainer 615 (see also FIGURE 8) provides a mount for pin 611, composed of a bolt 616 and nut 617, and is designed to encompass the entire combination of brake lever 605, the clevis connector 603 of brake rod 601, and the jack knife thrust member 608. Accordingly, and with reference to FIGURES 1, 6, 7 and 8, it will be seen that the clevis connector 502 in FIGURE 1 will always remain in the same disposition, rotationally speaking, and that upon extension of the push rod 501 in FIGURE 1 in a direction to the right of the viewer the jack knife thrust member 608 ultimately will come in contact (see FIGURE 6) with the lower left-hand edge of brake member 605 so as to apply a counterclockwise torque to this lever about the axis represented by pin 611.

This action serves to apply forces of tension upon brake rods 600 and 601 so as to accomplish a brake set. A subsequent withdrawal of the threaded push rod 501 from the brake set position, i.e. withdrawing the thrust rod in a direction to the left of the viewer, serves to release brake set, thus allowing the train wheels to rotate freely.

In FIGURES 1 and 9 lower support 16 includes a mounting flange 17, the same being fastened to the cylinder in FIGURE 1 by a plurality of bolts 18. A portion of this lower support 16 is a platform member 16′, this member being secured to member 16 by means of two bolts 19, two nuts 20, two studs 21 (forming at the top pivot posts) and two nuts 22 (see FIGURE 10). Mounted on the pivot posts 21 (see FIGURE 9) are a pair of respective pivot rods 23 and 24, these rods being provided with appropriate apertures (not shown) at ends 25 and 26 thereof. Washers 27 and 28 and cotter keys 29 and 30 complete the pivot post attachment as shown. If desired, the two pivot rods may be stamped from sheet metal to the elongated configuration shown, each having a rack seat 31 and 32, respectively, to accommodate the fixed mounting thereto as by welding of rack gears 33 and 34; in addition, these pivot rods must also supply the respective cam surface areas 35 and 36. End tabs 37 and 38 of the two pivot rods cooperate with L-shaped stops 39 and 40 so as to limit the outward travel of both rods. Additional outward travel might otherwise be experienced by virtue of the necessary inclusion of compression springs 41 and 42, each being mounted to respective pins 43 and 44 provided by the pivot rods and the platform body 45 as shown. The platform body 45 itself has a long, slender, cylindrical bore open at both ends thereof to receive rod aligning, shouldered washers 46 and 47. Guide rod 48 is threaded at both ends and passes through the alignment washers 46 and 47 therefor, to be secured by locknuts 49 and 50. A pressure spring 51 is disposed within the bore of the support body and engages at its ends washer 46 and with foremost interior flange 52′ of carrier member 52, shown in particularity in FIGURES 11 and 13. As FIGURE 11 illustrates, carrier member 52 is a basic member of the drive pinion and transmission gear assembly 53, the whole being mounted within the bore of the support body and being adapted to slide therealong in forward and reverse longitudinal directions. Referring now to FIGURES 11 and 13 it will be seen that carrier member 52 includes a post 53′ having a large shoulder area 54, a small shoulder area 55, and a threaded end portion 56. As is seen with particularity in FIGURE 11, the inner race 57 of ball-bearing unit 58 rests upon shoulder area 54 and, further, is seated thereon by the downward pressure of washer 59 and nut 60. Transmission gear 61 has a shank 62 which is provided with a forward, internal shoulder 63. The outer race 64 of ball-bearing unit 58 is securely seated to shoulder area 63 of transmission gear 61 by the externally threaded ring 66, the same threading into the threaded bore 65 of transmission gear 61. The gear and ring are retained together by the locking action of set screw 67. Sweated over the rear shank area as defined by shoulder 62′ of transmission gear 61 is drive pinion 69. See especially FIGURE 11. Accordingly, transmission gear 61 is free to rotate about post 53′. Drive pinion 69 carries transmission gear 61 along with it; accordingly, these two gears serve as a "gear means" for driving adjustment gear 405. Thus, when the drive pinion 69 is engaged by either of the two rack gears illustrated in FIGURE 9 at a time when carrier member 52 in FIGURES 11 and 13 is caused to slide along the interior bore of the support body in FIGURE 9, then the transmission gear 61 will be caused to rotate in accordance with the rotation of drive pinion 69.

Before considering carrier member 52 in all of its particulars as shown in FIGURE 13, it is well to note the springs 41 and 42 in FIGURE 11 (see also FIGURE 9) and to note that these springs keep the tabs 37 and 38 securely against the bracket stops 39 and 40, respectively, when the cam surfaces 35 and 36 of the rack gear pivot rods are not actuated.

Turning now to FIGURE 13 it is seen that carrier member 52, in addition to including the shouldered post 53′, also is provided with a rigid gear meshing collar 68 and a principal body portion 69′, the latter being provided with bore area 70. End A of the carrier member 52 represents the foreward end of this member; end B, the rearward end. (If desired for alignment purposes, it is conceivable that, as shown, the end A may have an aperture which is even smaller than that necessary to provide a spring reaction flange 52′. In such event it is conceivable that the forward, shaft aligning washer (washer 47) would not be needed, provided that the tolerance of shaft and aperture is small, i.e. of the order of .005 inch.)

Referring again to the collar 68 in FIGURE 13, it will be noted that this collar serves to urge the transmission gear 61 and the adjustment gear 405 into exact mesh alignment at those time intervals when the collar 68 engages the rear of cylindrical housing 14′ of carrier assembly 14. See again FIGURE 1 and also FIGURES 1B and 1C. Accordingly, it is seen that spring 51 keeps a constant pressure upon carrier member 52 in a forward direction so as to keep the transmission gear 61 and the adjustment gear 405 in perfect mesh during the outward travel of push rod 501. This action will continue until the carrier member 52 reaches its limit of travel as is determined by washer 47 in FIGURE 9. Further foreward advancement of the piston rod 12, the cylindrical housing 14′, and push rod 501 will leave the adjustment gear and transmission gear disengaged. This is permissible since the rack area is passed. (It should be noted here that the mounting of the transmission and pinion gear unit directly to the cylindrical housing 14′, while conceivable, is undesirable, practically speaking, owing to problems of weight transmission and brake rigging interference.) Upon returning in the reverse direction, i.e. toward the pressure cylinder, so that the gear meshing collar comes in contact with the rear of cylindrical housing 14′, the transmission gear and adjustment gear will come in perfect mesh. These gears will not turn, however, until either rack 33 or rack 34 in FIGURE 9 engages the drive pinion 69 (see FIGURES 1 and 11). If, however, arm 204 in FIGURE 2 is caused to progress inwardly so as to press against the cam area 36 of pivot rod 24 in FIGURE 9, then, upon the return of cylindrical housing 14′ so as to butt against collar 68, the arm 204 will come in contact (via portion 208) with the pivot rod 24 so as to direct rack 34 inwardly to engage drive pinion 69. Since the transmission gear and adjustment gear are in mesh, the two gears will turn in response to the turning of the pinion so as to shorten brake linkage, i.e. the effective length of push rod 501, and thereby lengthen piston travel. And since engagement of rack 33 with drive pinion 69 will produce the opposite rotation of transmission gear 61 and adjustment gear 405, it follows that the actuation of rack 33 will produce the opposite result. The length of the two racks determines respective single adjustments of the push rod.

Before considering the sensing means of the invention it will be well to note briefly the traveling mechanism of carrier assembly 14 in FIGURE 1, this mechanism being shown with particularity in FIGURE 14. See also FIGURE 1. It will be noted in these two figures that semicircular straps 140 and 141 are integral components of the travel mechanism 142, both straps having outwardly extending mounting ears 143 which are respectively secured together by nuts 144 and outwardly threaded studs 145. These studs 145 are secured as by means of threads or welding to base member 146, the latter having mounting flanges 147 and 148 to accommodate the mounting thereon of ball-bearing wheels 149 and 150. These ball-bearing wheels 149 and 150 roll along the support member rail areas F and G (see the support member in FIGURE 9), which rail areas are in part delineated by ridges H and I. It will be seen that this provision of the ball-bearing wheels 150 serve advantageously in the present invention in a manner to support the selector finger and engagement fingers assembly 15, the threaded push rod 501, and allied apparatus in their travel away from the back toward the pressure cylinder.

A final and most important consideration of the invention resides in the means provided for sensing abnormal piston travel due to wear of the brake rigging or brake shoes, etc. Reference is now made to FIGURE 15, FIGURE 15A and 15B. In these figures is disclosed the selector or guide plate 151 which by its design regulates the adjustment, if necessary, which the present invention produces in affecting piston travel. Selector plate 151 has a flange 152 which is bolted to cylinder 10 by bolts 18 as shown in FIGURE 1. A composite medial portion 153 joins the flange to the operating area 154 of the plate. This operating area 154 includes a series of ridges 155, a series of valleys 156, and a series of dogs 157. (A dog is illustrated in FIGURE 15 simply as a line with the arrow meeting a medial portion of the line in the direction of travel over the dog. Hence, the finger 210 in FIGURE 2 will travel over the dog (line) in the direction of the arrow but not in the reverse direction.)

FIGURE 16 and 17 indicate that a representative dog D may be either fixed and rigid, as illustrated in FIGURE 16, or spring biased as illustrated in FIGURE 17. Thus, in FIGURE 17 the dog D includes a pin 160 which cooperates with the central aperture 161 in ring 162, the latter being secured to selector plate 151 by screws or rivets 163. A compression spring 164 is disposed between the base of dog D and the ring 162. Accordingly, and in cases where finger 210 in FIGURE 2 is designed to be mounted rigidly to the FIGURE 2 assembly, this finger on passing over dog D in FIGURE 17 will merely depress dog against the compression spring 164 so as to be permitted to pass over the same, and this by virtue of the inclined surface of dog D in the direction of travel of the finger. When, however, the finger attempts to reverse direction it will not be able to traverse the dog thusly, owing to the vertical side 166 of the dog as relates to this direction.

The most convenient way of describing the pattern of the valleys, ridges and dogs in the plate shown in FIGURE 15 is to illustrate the travel of finger 210 in FIGURES 1 and 2 through the valleys and over the direction dogs thereof for various conditions of piston travel.

Assume as a first condition that desired piston travel is eight inches and that the brake rigging and brake shoes are in normal condition so that normal piston travel of eight inches will occur. In such event, when the brake cylinder is actuated so as to begin to advance piston rod 12 in FIGURE 1 to the right of the viewer, then the finger 210 in FIGURE 2, beginning at point O in FIGURE 15, will travel forwardly (to the right of the viewer) through valley A, over dog D′, through valley B, over dog E′, and into the region of valley C which lies between dog E′ and dog F′. Normally, "normal piston travel" is considered to exist where variation from a nominal value of piston travel does not exceed ⅜ of an inch either way (this resulting in an overall distance between dogs E′ and F′ of three-quarters of an inch). Since in the present case normal piston travel (i.e., within ⅜ of an inch either way) is found to exist, then, after brake set has been released, the piston, piston rod and thrust rod will return to their original inoperative position (the piston being returned by the pressure cylinder return spring to its original position) so that finger 210 in FIGURE 2 will return to starting point O through valley C, over dog C′, and through valley A to point O. Now it is true that during the forward stroke of normal piston travel the control finger did pass over dog D′ and did become deflected in a counter-clockwise direction (see FIGURE 2) so that a rotation of this finger and an actuation of the associated actuating arms did result. However, it will be noted in FIGURE 15 that point H in valley B exists to the left of dog D' and it is here explained that point H represents the point of contact (during travel) of the associated actuated arm with its associated rack, and that, therefore, rack and pinion inter-cooperation occurs, if at all, only to the left of point H in valley B. Thus, since this region is never reached during normal piston travel there will be no rack engagement with the drive pinion so as to affect the (here inoperative) transmission and adjustment gear unit.

Suppose, however, that there exists the situation of short piston travel, wherein brake set is accomplished before the piston has achieved its normal eight inch stroke. Referring again to FIGURE 15 it will be seen that the finger 210 of FIGURE 2 will start again at point O, travel through valley A, over dog D', stop somewhere within valley B, the precise point of stoppage in valley B being determined by the point at which brake set is achieved. Upon the release of the brakes the finger will return back to point O via channel B and, in doing so, the finger will reach point H in valley B. This time there has not only been a deflection in a counter-clockwise direction of the finger in FIGURE 2, owing to finger travel over dog D' into valley B, but also the finger has reached point H in valley B, which point determines the point at which arm 204 (at portion 208) in FIGURE 2 will contact the cam area 36 of pivot rod 24 in FIGURE 9 so as to thrust rack gear 34 inwardly to engage drive pinion 69. This rack and pinion engagement causes both the transmission gear and the adjustment gear to turn in a counterclockwise direction, the adjustment gear turning around the spiral push rod, so as to shorten brake linkage (the effective length of the push rod) and thus lengthen brake piston travel. Hence, after the adjustment has been accomplished, the finger moves back over dog D' to initial point O.

Assume in the third instance that during a brake set long piston travel has occurred. In such event the control finger will have passed from point O, through valley A, over dog D', through valley B, over dogs E' and F' into the extension D" of valley D, before brake set is achieved. In such event, upon release of the brakes the return stroke of the piston will return the finger from extension area D" into valley D proper until the finger arrives at point G. Point G marks the point at which the actuating arm 205 (at portion 209) in FIGURE 2 will come in contact with cam area 35 of pivot rod 23 so as to urge rack 33 into engagement with drive pinion 69. Further backward movement, by virtue of this engagement, causes the clockwise rotation of the adjustment gear and the transmission gear, thus moving the adjustment gear clockwise around the spiral push rod 501 so as to lengthen the brake linkage, i.e. the effective length of the spiral push rod, and shorten piston travel. After the adjustment has been accomplished the drive pinion transmission gear assembly 53 moves past the rack area, with the finger 210 in FIGURE 2 passing through the inner extremity of valley D, over dog A' to point O, the point of the beginning.

It will be noted in connection with the above that the series of ridges, valleys, and dogs of the selector plate 151 define a plurality of round-trip travel paths for finger 210, with valley A (see FIGURE 15) serving as a common, outgoing, travel-path segment.

It will be noted additionally that the linkage adjustment will be dependent upon the length of each of the respective racks. Further, it will be noted that irrespective of the length or shortness of piston travel, a single brake set will produce only a constant, discrete adjustment of the linkage. For all practical purposes no variable adjustment of brake linkage during a single brake set need be required since wear in the brake rigging and brake shoes is a gradual process.

While the transmission and adjustment gears are shown as 45° bevel gears, conceivably other types of gears might reasonably be employed.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. In a fluid-operating braking system including a brake cylinder, a brake-operating piston with a piston rod connected thereto, and brake rigging: apparatus linking said piston rod with said brake rigging and including a compensating mechanism which automatically compensates for deviations from desired linkage slack as are caused by wear in the rigging and the installation of new brake shoes, for example, to the end that the fluid-operated, brake set producing power stroke of said system will be maintained at a substantially constant length, said compensating mechanism including, in combination, a threaded push rod coupled to said brake rigging; an adjustment gear having a threaded, axial bore, said gear threadably receiving said push rod at said bore; push rod reference means journalling said adjustment gear for rotation and fixing the disposition of said gear against translation with respect thereto; gear means engageable with said adjustment gear for rotating said adjustment gear and thereby adjusting the longitudinal disposition of said push rod relative to said adjustment gear and said reference means, said gear means including a pinion; first and second rack means disposed on opposite sides of said pinion, said rack means being engageable, selectively and alternatively, with said pinion on return, out-of-adjustment strokes only of said piston rod, for rotating said gear means and, consequently, said adjustment gear, to so adjust the disposition of said push rod with respect to said adjustment gear and reference means; and means, including a selector plate, coupled to and, in part, fixedly disposed with respect to said piston rod for selectively urging one of said rack means into engagement with said pinion on these return, out-of-adjustment strokes of said piston rod, the particular rack means urged into engagement with said pinion depending upon whether the out-of-adjustment piston rod travel is long or short in comparison with desired piston rod travel in accomplishing brake set, so as to adjust appropriately the disposition of said push rod with respect to said adjustment gear and reference means as aforementioned.

2. Apparatus according to claim 1 wherein said brake rigging includes a hand-operated, brake-actuating flexible connector and a pair of parallel brake rods actuable in respective opposite directions and wherein said apparatus includes: a brake lever pivotally connected at one end thereof to said flexible connector, at the remaining end thereof to a respective one of said brake rods, and at a medial point to the remaining brake rod; means for applying torque to said brake lever about the point of attachment therewith of said remaining brake rod, said means being provided with an elongated connecting aperture, said push rod being provided with a clevis connector; and pin means disposed through said elongated aperture coupling said clevis connector to said torque means.

3. Apparatus according to claim 1 wherein said adjustment gear of said compensating mechanism exhibits an axial shank provided with said bore, and wherein said push rod reference means includes a cylindrical housing fixedly mounted to said piston rod and bearing means rotatably mounting said adjustment gear shank within said cylindrical housing.

4. Apparatus according to claim 1 wherein said adjustment gear comprises a bevel gear and said gear means said compensating mechanism also includes a transmission gear, also comprising a bevel gear, said transmission gear being engageable with said adjustment gear and being connected to said pinion for rotation therewith.

5. Apparatus according to claim 3 wherein said piston rod is hollow at least for a substantial length of its outer extremity, said cylindrical housing being coaxially mounted onto said piston rod and said push rod being coaxially aligned with said piston rod, said push rod passing through said cylindrical housing and rearwardly entering said hollow piston rod and adapted for translational displacement therewithin in accordance with the rotation of said adjustment gear.

6. Apparatus according to claim 1 wherein said urging means includes a radially extending finger means coupled to said piston rod for lateral rotational displacement with respect thereto and provided with a pair of actuating arms respectively cooperable with said first and second rack means for respectively urging the same inwardly to engage said pinion in response to the rotational deflections of said finger means; and a guide plate fixedly disposed with respect to said cylinder and having a series of ridges, valleys and dogs defining long travel path, short travel path, and normal travel path patterns for said finger means, "long," "short" and "normal" referring to piston rod travel, the finger means in following the short travel path pattern experiencing deflection on one direction, thus causing a respective one of said arms to urge the associated rack means into engagement with the said pinion during a portion of the return stroke of said piston rod, thereby lengthening push rod linkage, the finger means in following the long travel path pattern experiencing deflection in the opposite direction, thus causing the remaining arm to urge the remaining rack means into engagement with said pinion during a portion of the return stroke of said piston rod, thereby shortening push rod linkage, and the finger means in following the normal, in-adjustment path experiencing no rotational deflection as might actuate either of said rack means.

7. Apparatus according to claim 3 wherein said push rod of said compensating mechanism is provided with an unthreaded rearword portion of greater dimension than the threaded bore of said shank.

8. Apparatus according to claim 6 wherein said push rod reference means includes a cylindrical housing mounted to said piston rod, said housing being provided with a recess, and said finger means being disposed about said cylindrical housing and seated within said recess.

9. Apparatus according to claim 7 wherein said push rod of said compensating mechanism includes a spacer guide collar coaxially aligning said push rod rearwardly within said piston rod.

10. Apparatus according to claim 8 wherein said urging means of said compensating mechanism includes a lower support member fixedly disposed with respect to said cylinder, said rack means being pivotally disposed upon said support member, said lower support member being provided with a longitudinally oriented bore parallel with said piston rod and said push rod, a carrier member spring loaded within said bore, said adjustment gear being journalled in said cylindrical housing, and said carrier member being provided with a collar engageable with said housig at and for transmission gear and adjustment gear mesh.

11. Apparatus according to claim 10 in which said push rod reference means includes a transport carriage connected to said housing and provided with a set of wheels riding on said lower support member.

References Cited in the file of this patent

UNITED STATES PATENTS

| | | |
|---|---|---|
| 639,798 | Wands | Dec. 26, 1899 |
| 1,976,560 | Hewitt | Oct. 9, 1934 |
| 2,599,377 | Farnworth | June 3, 1952 |
| 2,684,132 | Snyder | July 20, 1954 |

FOREIGN PATENTS

| | | |
|---|---|---|
| 49,209 | France | Sept. 6, 1938 |